Nov. 24, 1931.                J. C. MATHEWS                1,833,170
                               HANGING SCALE
                       Filed Feb. 19, 1931    9 Sheets-Sheet 1
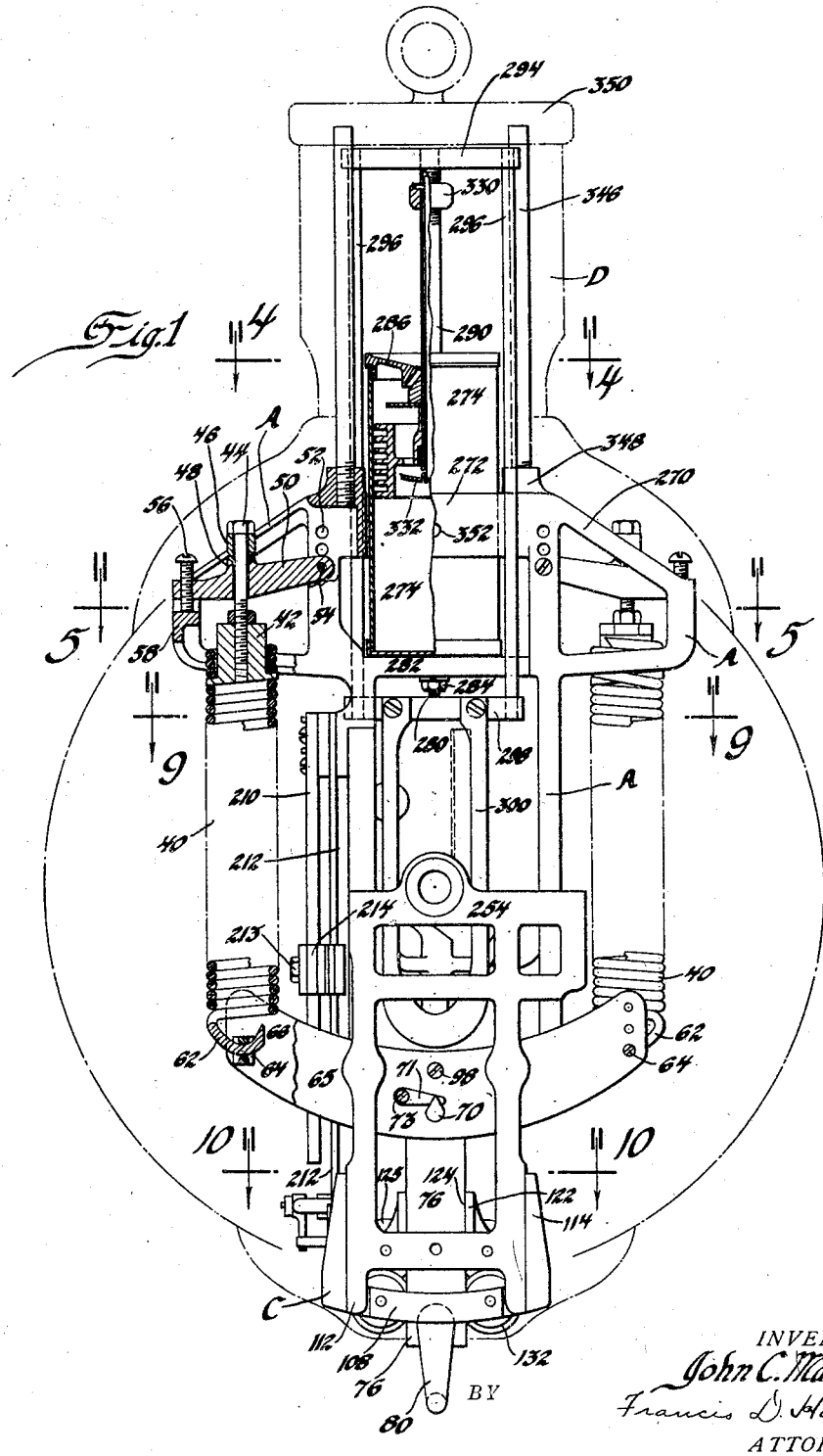
INVENTOR
John C. Mathews
BY Francis D. Hardesty
ATTORNEY

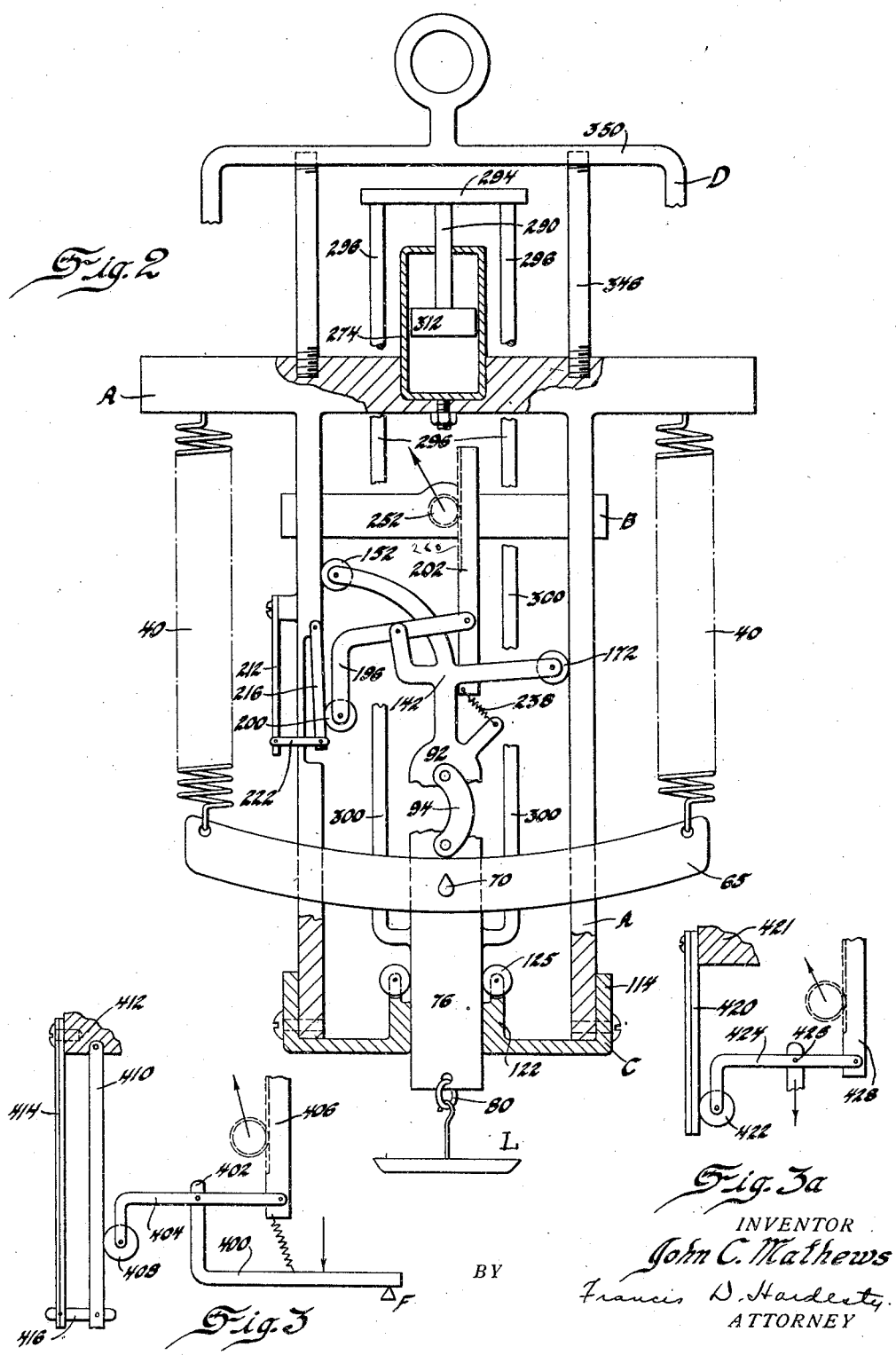

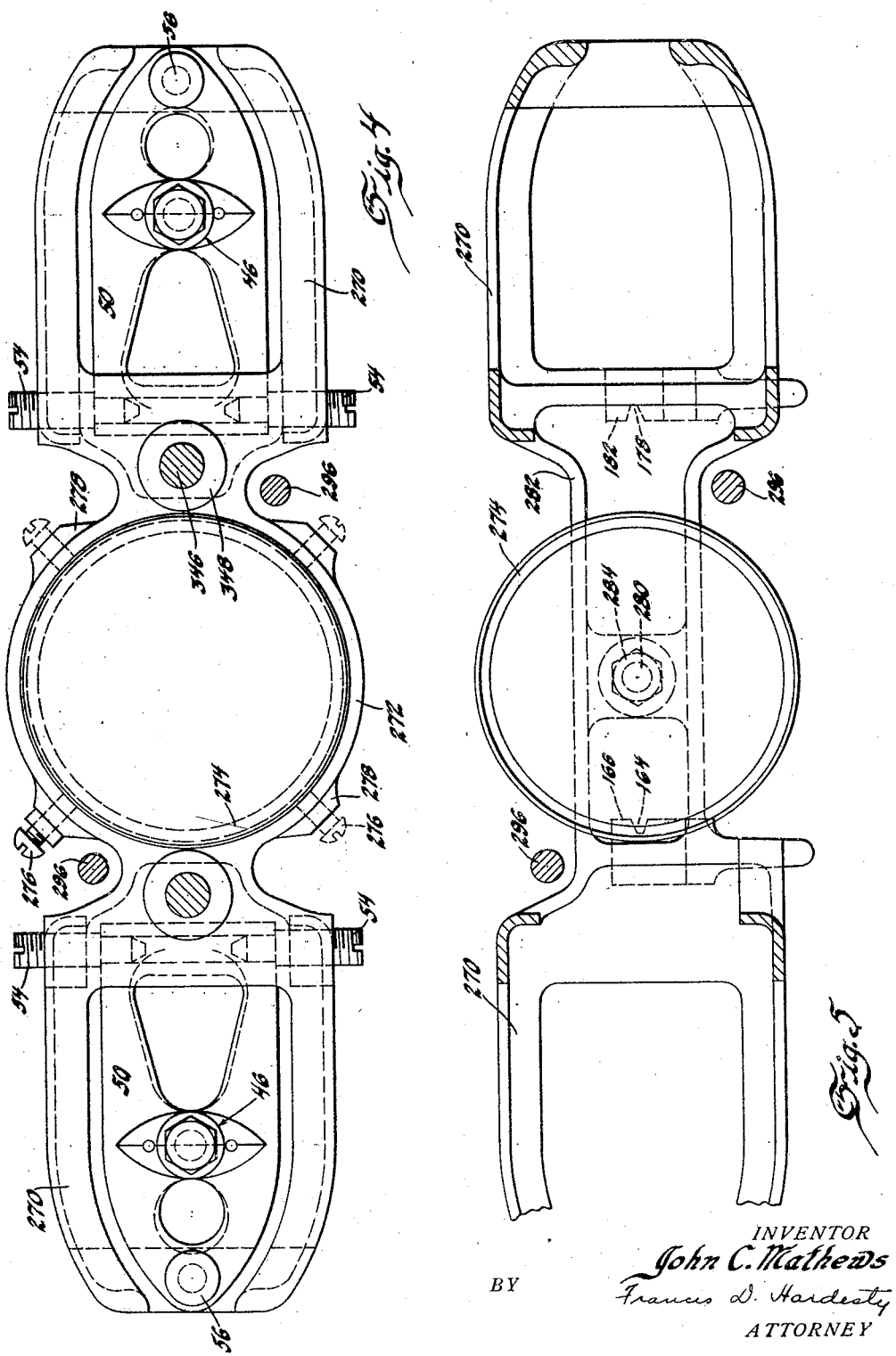

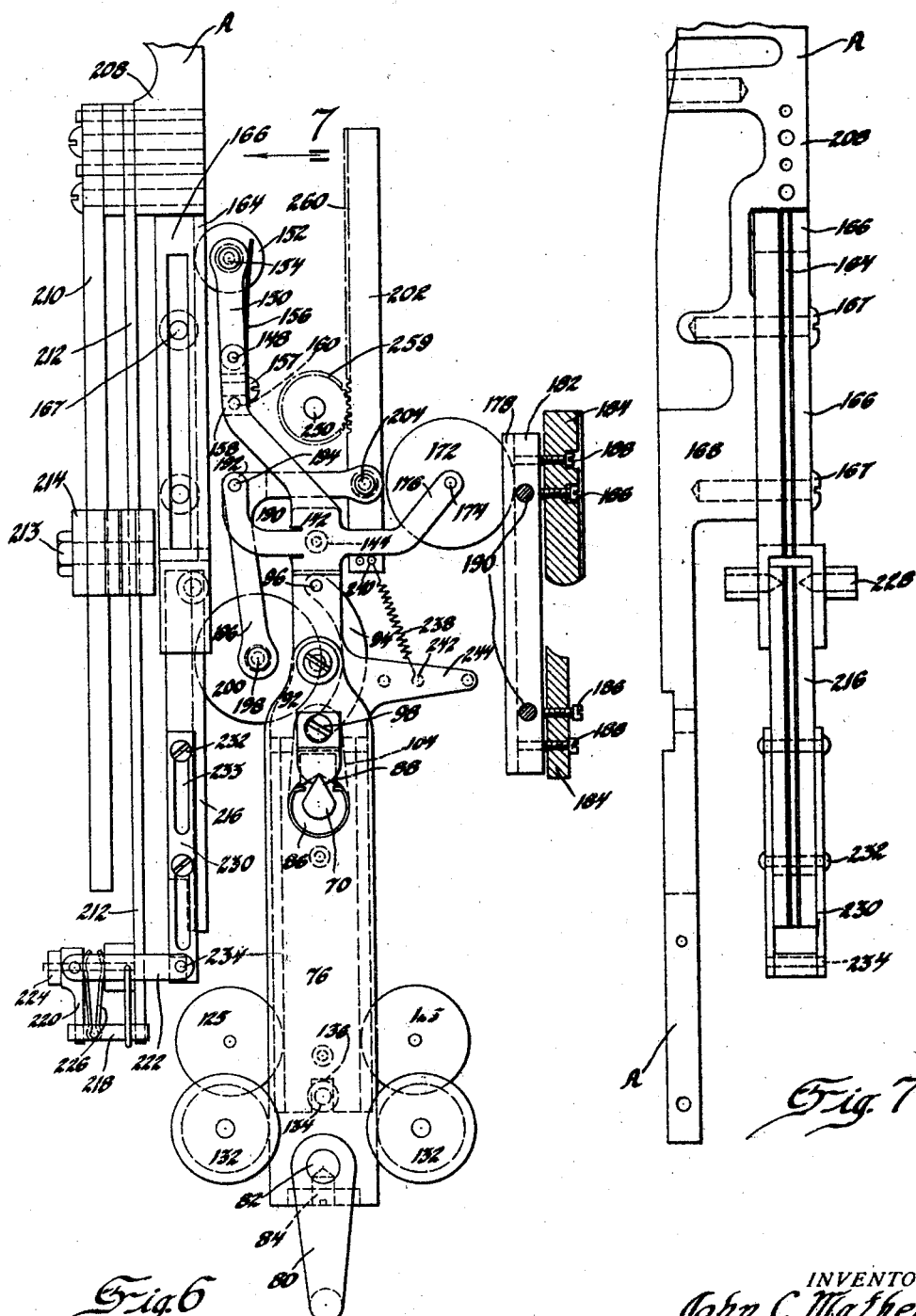

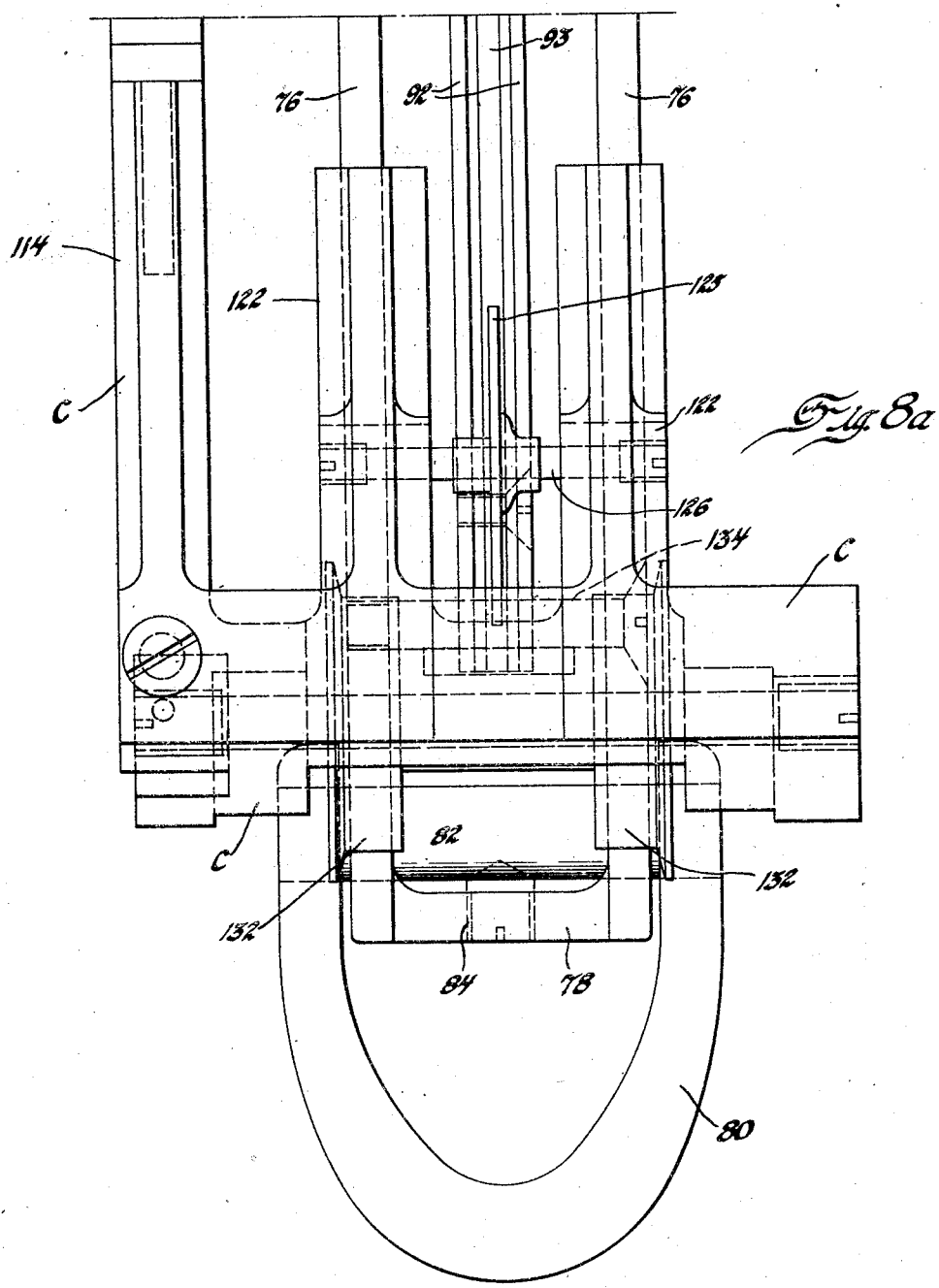

Nov. 24, 1931.  J. C. MATHEWS  1,833,170
HANGING SCALE
Filed Feb. 19, 1931   9 Sheets-Sheet 6

INVENTOR
John C. Mathews
BY Francis D. Hardesty
ATTORNEY

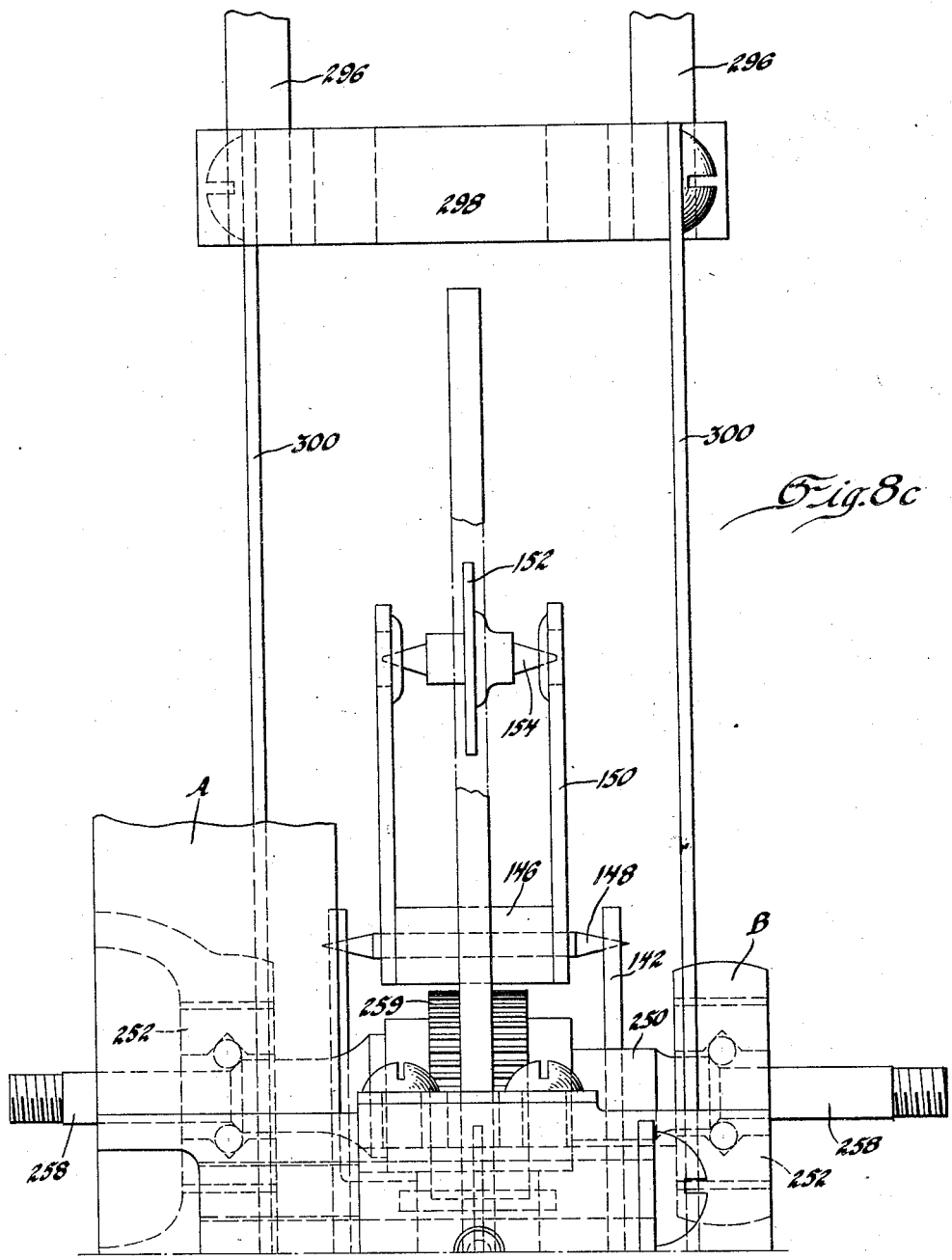

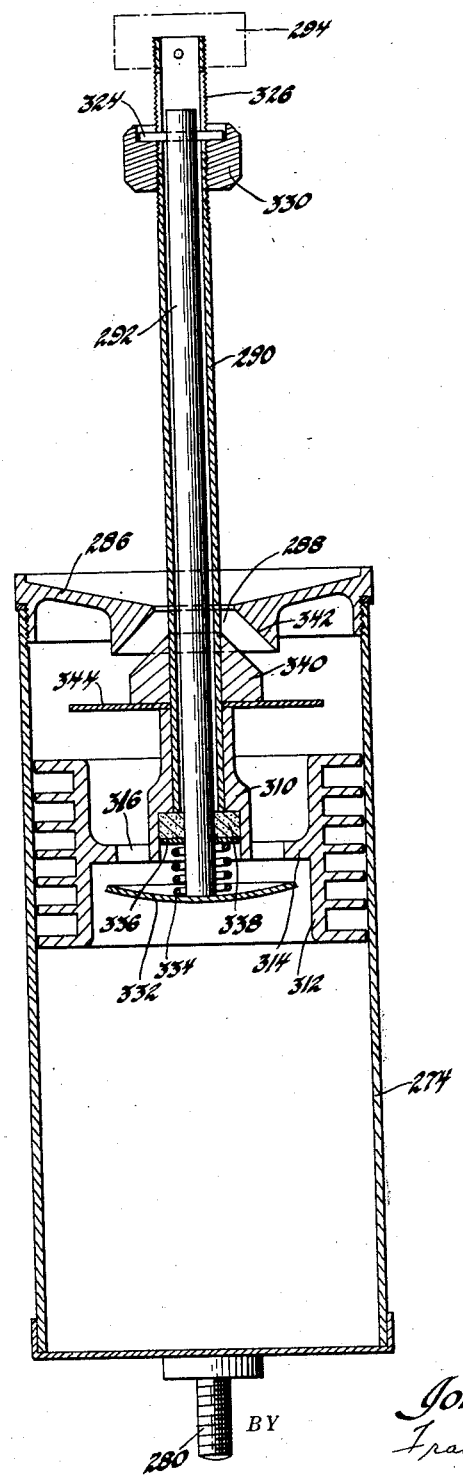

Patented Nov. 24, 1931

1,833,170

UNITED STATES PATENT OFFICE

JOHN C. MATHEWS, OF DETROIT, MICHIGAN, ASSIGNOR TO THE STANDARD COMPUTING SCALE COMPANY, OF DETROIT, MICHIGAN, A CORPORATION OF MICHIGAN

HANGING SCALE

Application filed February 19, 1931. Serial No. 516,952.

This invention relates to scales and more particularly to thermostatic controls for scales.

While the elements forming the invention are disclosed in connection with a hanging scale, it can readily be seen that scales of other types embodying the invention hereinafter described may be constructed without departing from the spirit of the invention.

There have previously been provided a number of thermostatic controls for scales and various types of such controls will now be listed and described very briefly in order to define more clearly the control forming the invention of this case.

One type of control disclosed in the patent to L. Jaenichen, No. 1,185,675, June 16, 1916, includes a thermostat of the metallic bellows type, secured to a weighing lever and controlling the distance between the lever fulcrum and the rack rod pin, on the range line of the lever. The metallic bellows at one end is connected to the lever, and at the other end is connected to the rack rod.

A second type, disclosed in the patent to L. Jaenichen No. 1,221,026, June 26, 1917, includes a thermostatic bar attached to the rack rod to change the distance from the lever fulcrum to the rack rod pin by moving the latter with respect to the lever.

In the types above referred to, one characteristic is common to all, namely, the thermally responsive element, whether it be a thermostatic bar or a thermostatic bellows, connects two moving parts of a scale, and at no place is anchored to a fixed portion of the scale. In other words, the thermostat may be considered as "full floating".

In the thermostatic control forming part of the present invention, one important characteristic is the anchoring of the thermally responsive elements, namely, the bimetallic thermostat and the grooved track linked to the thermostat to the stationary main frame of the scale. Accordingly, the thermostat and grooved track are not in this scale what might be termed full floating parts such as those referred to above but are rather anchored parts.

A third type, disclosed in the patent to L. Jaenichen No. 923,530, June 1, 1909, includes a thermostat anchored to the main frame and connected to the weighing springs so as to change the spring resistance in accordance with temperature changes.

The thermostatic control of the present application is also anchored to the main frame, but varies the travel of the rack rod in its relation to the travel of the springs and the load.

An object of this invention, therefore, is the thermostatic control above referred to and employing thermally responsive elements anchored entirely to the stationary frame of the scale which alter the inclination of the grooved track and the travel of the weight indicating mechanism without altering the travel of the springs and of the load.

A still further object is a thermostat for scales wherein a track is employed to guide the path of movement of a weighing or weight indicating part, the track being connected to the thermally responsive element in such a manner as to move in accordance with changes in the temperature so as to alter the travel of the weight indicating part.

Further objects include embodiments of scale parts hereinafter to be described, including a stem and runner unit for hanging scales which supports the load and is operatively connected to the rack rod, the unit being guided in its movement in the main frame by substantially frictionless mechanism.

Still other objects will readily occur to those skilled in the art upon reference to the following description and the accompanying drawings in which Fig. 1 is a front view in part of the scale, parts being broken away and shown in section for purposes of clarity.

Fig. 2 is a diagrammatical front view of the scale.

Fig. 3 and 3a are diagrammatical views of modified forms of scales, each embodying the invention.

Figs. 4 and 5 are sections on lines 4—4 and 5—5 of Fig. 1.

Fig. 6 is a view of the running gear unit of the scale and the thermal control therefor.

Fig. 7 is a view as if in the direction of the arrow 7 of Fig. 6.

Fig. 8a is a partial side view of the scale, showing the lower portion.

Figure 8B:
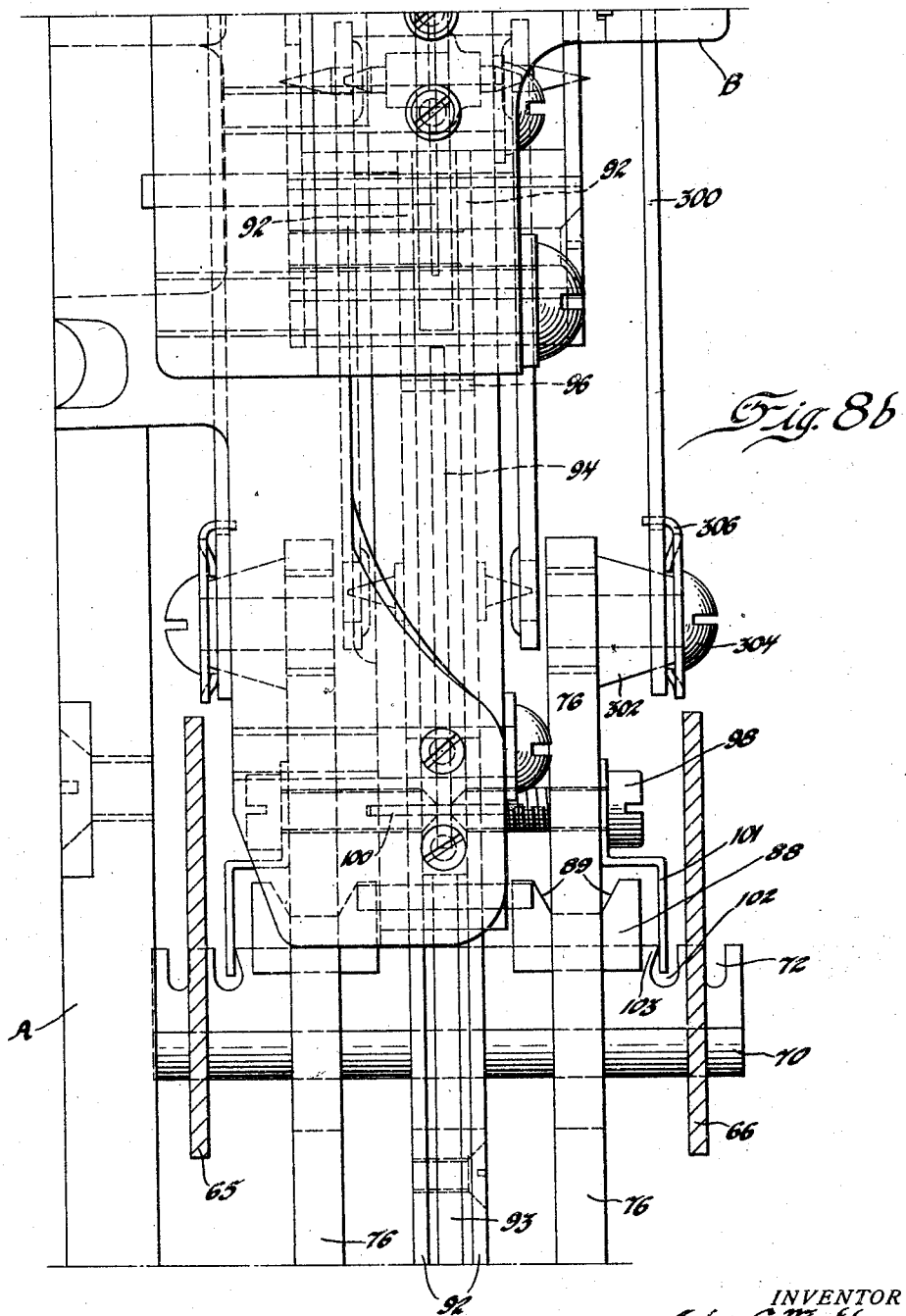

Fig. 8b is a similar view showing the central portion.

Fig. 8c is a similar view showing the upper portion.

(Figs. 8a, 8b, and 8c are to be considered as one, and are to be arranged with Fig. 8c above Fig. 8b, and Fig. 8b above Fig. 8a.)

Figure 9:
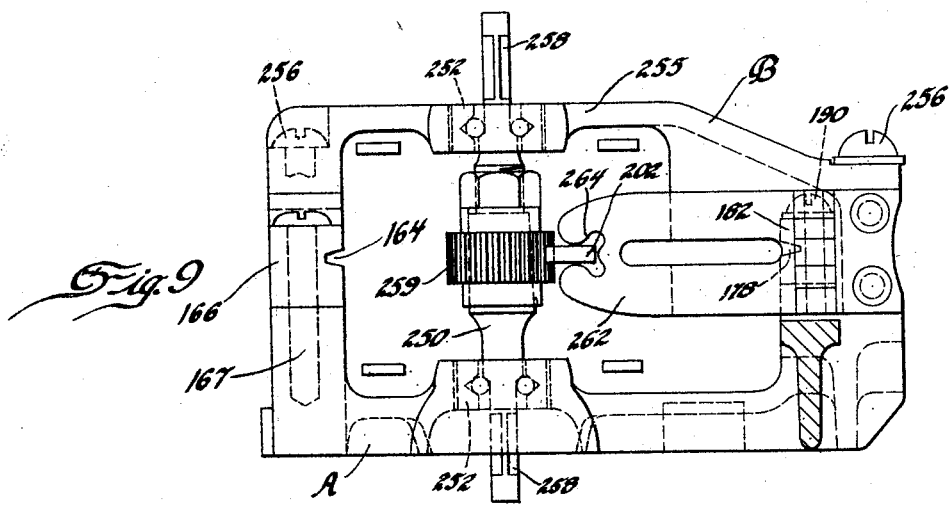
Figure 10:
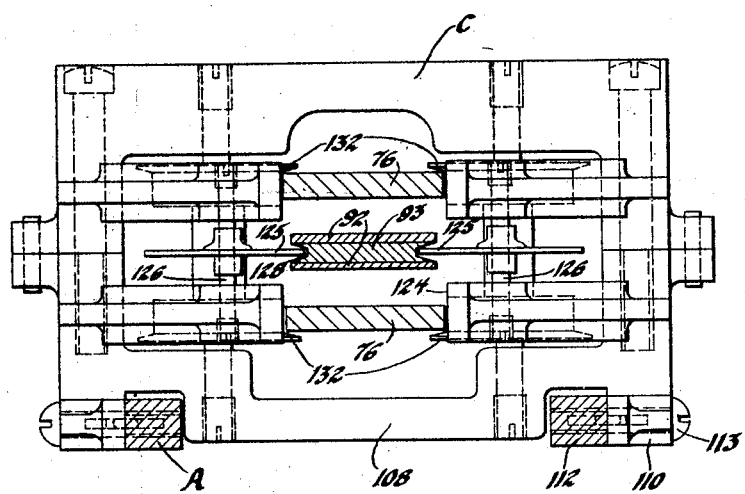

Figs. 9 and 10 are sections on lines 9—9 and 10—10 of Fig. 1.

Fig. 11 is a detail section view of a dashpot used with the scale of the invention.

Referring to the drawings, and more particularly to Figs. 1 and 2, it will be seen that the scale includes a framework or chassis, upon which may be mounted the running gear of the scale, the whole being enclosed in a casing which is secured to the chassis in any suitable fashion.

Like most hanging scales, the scale shown is suspended from a ceiling, beam, or hanger by means passing thru an eye in the casing or in the chassis, and the scale is to be used in conjunction with a weighing pan or load receiver, suspended from a clevis in the lower end of the runing gear by means of a hook passing thru the clevis.

The component parts of the weighing mechanism will now be described.

*Framework or chassis*

The chassis of the entire scale, shown best in Figs. 1 and 2, includes a main frame A, a back frame B, and a bottom frame C, all of which is enclosed in a casing D.

The main frame A, generally of T shape in front elevation, includes an upper horizontal portion and depending vertically disposed central portions, all of these portions being integral with one another. The upper portion forms a support for the load springs, and a dashpot, while the central portions form a support for the back frame, the bottom frame, and the running gear of the scale. The central portions also support the thermostat which controls the action of parts of the running gear.

The back frame B, secured to the central portions of the main frame in back of them, midway between the upper and lower ends of the central portions, cooperates with a cross brace part of the main frame to form a support for the pointer shaft, and to guide and support moving parts of the running gear.

To the chassis, formed as described above, the running gear of the scale is attached in a manner which will presently be described.

In each of the two lateral arms of the upper or horizontal portion of the main frame are disposed means for connecting an end of a load spring to the main frame. As shown, each load spring 40 is provided in its upper end with a spring connector 42, into which is threaded a bolt 44 passing thru a spring holder 46 riding in the V-notch 48 in the holder bar 50, one end of which is pivotally mounted in a selected one of the apertures 52 in the main frame, by means of a screw 54, and the other end of which is provided with a zero adjusting screw 56 resting on a seat 58 in the main frame.

The lower ends of springs 40 are hooked as at 62, passing thru apertures in the pins 64 which connect the front equalizer bar 65 with the back equalizer bar 66, at their ends. In this manner the equalizer bars are made to float with respect to the frame, and since the running gear is secured to the equalizer, the gear itself floats freely with respect to the frame.

*Running gear*

Between the equalizer arms, the running gear unit is disposed, the connection between the arms and the running gear unit including a main pivot 70, straddling the parallel equalizer arms, and held centrally therein by means of small plates 71 fitting in slots 72 (Fig. 8b) near the ends of the pivot, the plates being secured to the outer surfaces of the equalizer arms by screws 73. The running gear unit is connected to the load at its lower end and to the indicating means at its upper end, and serves to transfer the load pull to the equalizer and thus to the load springs.

The running gear unit and its component parts will now be described. The unit includes an elongated U shaped runner base 78. A clevis 80, to which the load pan may be attached, is secured to the runner by an axle pin 82, held in its place in the runner by a set screw 84 threaded thru the base 78. Near their upper ends, the runner plates are provided with large aligned holes 86 thru which the main pivot 70 may be passed loosely. The upper portions of the holes 86 are extended to provide slots in which the bearings 88 are disposed, the bearings having inverted V scarfs into which the upper or knife edge of the main pivot may be seated, this construction providing a knife edged pivotal connection between the equalizer and the runner, as will be observed very readily.

Further, the bearings 88 are slotted centrally on their upper surfaces to provide seats in which an edge of the runner plates may be seated, the portions 89 of the bearings, on the sides of the slot, tending to prevent shifting of the bearings in the runner plates.

Between the runner plates there is disposed a full floating stem unit, which forms an important part of the invention. The stem unit includes two stem plates 92 secured to a stem guide 93 between them, the whole forming a stem unit which is connected to the runner by a crescent shaped connector 94, the upper end of which is pivotally connected to the stem unit by a pivot pin 96, and the lower end of which is connected to the runner plates 76 by a frictionless pivotal connection including screws 98 threaded thru the runner plates and containing a pin 100 passing thru an aperture in the end of the connector 94.

The screws 98 also serve to clamp to the runner plates 776 two offset friction plates 101 whose lower ends are disposed in undercut slots 102 in the upper edge of the main pivot 70, these plates engaging the sharp points 103 on the upper edge of the pivot to maintain the running gear unit centrally on the main pivot and centrally between the equalizer plates 65 and 66, as shown in Fig. 8b.

It will be seen that the stem plates and guides are provided with large cutouts 104, freely surrounding the pivot 70 and the pin 100, and in this manner, the stem unit is rendered full floating with respect to the runner plate, tho' its endwise movement is in unison with that of the runner.

*Runner gear guides—lower end*

In order to guide the runner and stem unit in its movement in the scale, the chassis is provided with freely rotatable wheels which engage runner and stem parts to guide them, without friction, and such construction will now be described.

Secured to the lower ends of the main frame A is the bottom frame C in which the guides for the lower ends of the runner and stem are mounted and provided. The bottom frame includes a front part and a rear part, which combine to form a hollow frame, as shown in Figs. 1 and 10.

The base 108 of the bottom frame has a pair of forwardly projecting lugs 110 secured to the ends 112 of the main frame by securing screws 113. Projecting upwardly from the base 108 are lugs 114 which are slotted to receive dowels (not shown) by means of which the bottom frame is aligned with the main frame. Projecting inwardly from the sides of the bottom frame are a pair of arms 122 which are formed with vertical face bearings for the runner plates 76 to guide the runner. Further, the arms 122 bear thin wheels 125, mounted upon axles 126, and which fit in the grooved edges 128 of the stem guide 93 to guide the latter. The base 108 also carries freely rotatable flanged wheels 132, which also cooperate with the edges of the runner plates to guide them in their movement. In this fashion the lower end of the runner and stem group is guided in its movement between the equalizer bars 65 and 66 as will be seen.

To maintain the connector, the runner and the floating stem in approximate alignment, each with the other, to facilitate inserting them, when together, into the frame, the runner has the screw 134 (Fig. 6) which passes freely thru the larger slot 136 in the stem, when in the scale the runner and stem are otherwise guided which prevents contact between the screw and the slot.

At their upper ends, the stem plates 92 are rigidly secured to each other and to a pair of inverted T shaped stem forks 142, by suitable fastening means, including a screw 144, as shown. The stem forks as a unit, present three ends, to which are secured respectively, a top or pressure guide wheel unit, a back guide wheel unit and a bell crank thermal control unit and each of these will now be described.

The top or pressure guide wheel unit includes a block 146 mounted between the forks on an axle pin 148, the latter serving as a pinion for the wheel frame parts 150 which support the pressure wheel 152 on a hub 154. A U shaped flat spring 156 is secured to a block 158 secured to the fork ends by a screw 160, and serves to force the pressure wheel and its frame, towards the guiding or grooved surface 164 provided in the guiding member 166 secured by the screws 167 to the depending leg 168 of the main frame A, as will be readily observed.

The back guide wheel unit includes a wheel 172 mounted on an axle pin 174 disposed in extremities 176 of the stem forks 142, the wheel riding in a groove 178 of the back guide 182. The latter is adjustably secured to the main frame A, by a pair of screws 190. A push screw 186 and a pull screw 188 thru a lug of the main frame and a push-screw 186 and a pull screw 188 thru the back frame B provide means for adjusting the back guide sideways in the frames.

The bell crank thermal control unit, the bell crank part of which is secured to the stem forks 142, and the thermal control part of which is secured to the main frame forms an extremely important part of the invention, and it will now be described in detail.

Pivotally connected to the extremities 192 of the forks 142 by means of an axle pin 194, are a pair of bell cranks 196. The lower ends of the bell cranks carry between them an axle pin 198 bearing a thin guide and control wheel 200, and the upper ends of the bell cranks are pivotally connected to the rack rod 202 by means of the axle pin 204 and parts generally associated therewith.

Fixedly secured to a part 208 of the main frame A are the bars 210 and 212, the latter of which is of two metals, brass and steel, to form a bimetallic thermal control element. Intermediate their ends the bars 210 and 212 are clamped to each other by the screw 213 and clamp 214, the latter being slidable, up or down, as desired, to vary the free-moving length of the thermal bar 212, as will be seen.

At its lower end, the thermal bar 212 is connected to a grooved track 216 in which rides the wheel 200. The connection between the bar 212 and the track 216 is adjustable and includes a yoke 222 connected at one end to the plates 230 at 234 (Fig. 6) and at its other end to the plate 220. The nut and bolt device 224 is fastened to the bar 212 and adjusts distance of the plate 220 and through the yoke 222 the distance of track 216 in relation to thermal bar 212, the spring 226 preventing lost motion in the adjustment. The yoke 218 secured to the bar 212 guides lower end of plate 220 and spring 226.

The track 216 is pivotally mounted in the lower or forked end of the grooved pressure wheel guide member 166 by means of the taper point screws 228, and is provided with plates 230 adjustably secured to it by the screw and slot devices 232—233. The lower end of the plates are connected to the yoke 222 by the pin 234. In this manner, the position of the rack rod 202 will depend largely upon the temperature, since its position is under the control of the thermal bar 212, operating thru the bell crank parts of the rack rod control unit. Further, movement of the rack rod by the bar 212 is resisted and influenced by the spring 238, one of whose ends is connected to the rack rod at 240 and the other of whose ends is connected at 242 to an arm 244 formed rigidly and integrally with one of the stem plates 92.

In order to indicate the effect of the load upon the clevis at the lower end of the scale running gear, a pointer shaft 250 (Fig. 8c) journalled in ball bearings 252, one of which is in the cross bar 254 forming part of the main frame A (Fig. 1), and the other of which is in the cross bar 255 of the back frame B, the latter being fixedly secured to the main frame by the screws 256, as shown in Fig. 9. The pointer shaft 250 has projecting ends 258 to which are secured the pointers (not shown) and is also provided with gear teeth 259 adapted to cooperate with the rack teeth 260 formed on the rack rod 202, whereby the latter, in its vertical reciprocating movement, will rotate the pointer shaft.

It will be observed at this time, that the back frame B has hingedly secured to it a forked plate 262, in the fork 264 of which is disposed the rack rod 202, the fork serving to guide the rod in its movement.

*Dash pot (Figs. 1, 2 and 11)*

The upper or horizontal end portion of the main frame A, as illustrated in Figs. 1 and 4, includes two portions 270 in which are located the spring connecting means previously described, and also includes a ring portion 272 integral with and connecting the portions 270. In the ring 272 there is disposed a cylindrical casing 274, aligned with and held in place in the ring by four radial screws 276 threaded thru bosses 278 formed on the ring 272. The lower end of the casing is provided with a bolt 280 passing thru an aperture in a cross bar 282 formed as part of the main frame, the bolt being engaged by a nut 284 so that the lower end of the casing 274 may be anchored in the main frame.

The upper end of the casing is formed by a plate 286 having an aperture 288 thru which passes the piston rods 290 and 292. The piston rod 290, which is hollow and in the form of an elongated tube, is secured at its upper end to a cross head 294, the latter being secured to the upper ends of two diagonally positioned dash pot rods 296, whose lower ends are fixed to the yoke 298 as shown in Figs. 1 and 8c. Attached to the yoke 298, are two dash pot plates 300 which in turn are secured to the upper ends of the runner plates 76, by means of the cones 302, studs 304, and spring washers 306, as shown in Fig. 8b, the dash pot plates having tapered holes cooperating with the cones 302. In this fashion piston rod 290 is operatively connected to the runner and stem unit of the scale, the piston thus moving in fixed relation to the scale running gear.

The lower end of the tube or rod 290 is secured to the hollow hub 310 of the dash pot piston 312, and the spider 314 between the hub and the piston wall is perforated as at 316, so that as the piston rod and piston move up or down in response to movement by, the runner group, the oil with which the casing is partially filled will pass out thru the perforations, to cause the well known dash pot action.

In order to control the speed with which oil can pass thru openings 316, a dash pot valve means is provided, and such means will now be described.

The upper end of the rod 292 is secured to the rod 290 by the pins 324 passed thru a slot 326 in the tube or rod 290 and thru an aperture in the rod 292, the pin resting on an adjusting nut 330 threadedly secured to the tube 290. The lower end of rod 292 is provided with a plate valve 332, normally held away from the perforations 316 whose opening it controls, by the spring 334 abutting the plate 336 and the packing 338, as shown, the packing and spring also serving to prevent leakage between the rods 290 and 292.

It will be observed that as the piston moves down, the oil under the valve 332 will tend to cause it to close the openings 316, such tendency being resisted by the spring 334, the balance between the closing tendency and the opening tendency being chosen as desired.

In order to close the dash pot opening 288, when the dash pot piston is moved to its uppermost position by the load springs 40, the tube 290 is provided with a cone valve 340 which cooperates with a conical seat 342 formed as part of the top plate 286, about the hole 288 in such plate 286. Further, a splash plate 344 is provided on the tube 290 to prevent oil from passing between the cone valve 340 and its seat 342.

The dash pot, as a whole is surrounded by the scale casing D, which is fixedly secured to the main frame A by the rods 346, threaded into bosses 348 in the main frame, and connected to the cap or top piece 350 of the casing D.

Further, the ring brace 272, which supports the dash pot is provided with tapped holes 352, adapted to receive screws (not shown) by means of which the scale charts may be secured to the main frame, other tapped holes for this purpose being shown elsewhere, and not being described, since the securing of a scale chart to a frame in this manner is well known to the art.

Modifications (Figs. 3 and 3a)

The thermostatic control described in the foregoing may be utilized in a lever scale, as shown in Fig. 3. The weighing lever 400, pivotally mounted on the fulcrum F, is moved by the load L, as is usual. The end 402 of the lever is pivotally connected to the bell crank 404, so as to move the latter in accordance with the effect of the load. One end of the bell crank is pivotally connected to the rack rod 406, and the other end is provided with a wheel 408 which rides upon the track 410, pivotally mounted on the stationary frame part 412, to which the thermal bar 414 is secured. The bar and the track are pivotally connected by the link 416, as shown, and a spring connects rack 406 to lever 400.

It will be seen that load upon the lever 400 moves the rack rod 406, and that the travel of the latter is affected by the position of the thermal bar 414.

In the form of Fig. 3a, the thermal bar 420 secured to the frame 421 itself forms the track upon which the wheeled end 422 of the bell crank 424 is adapted to ride, as the crank is moved in accordance with the load L, connected thereto at the pivot 426, and as the crank moves the rack rod 428. While this modification is perhaps not so satisfactorily operable as those wherein the track and the thermal bar are separate, due to the curving of the bar on expansion or contraction, it will operate and it can therefore be seen that the separate track and bar, tho preferable, is not absolutely necessary.

Now having described the invention and the preferred embodiment thereof, it is to be understood that the said invention is to be limited, not to the specific details herein set forth, but only by the scope of the claims which follow:

1. For a scale having an indicator mechanism, a thermostatic control including a member operatively connected to the indicator mechanism and to the load so as to move the former in accordance with the effect of the latter, a track for said member to guide the latter in its movement, and thermally responsive means to move the track so as to vary the path of movement of the member as it rides upon the track.

2. For a scale having an indicator mechanism, a thermostatic control including a member operatively connected to the indicator mechanism and to the load so as to move the former in accordance with the effect of the latter, a track for said member to guide the latter in its movement, and thermally responsive means secured to the stationary frame of the scale to move the track so as to vary the path of movement of the member as it rides upon the track.

3. For a scale having an indicator mechanism, a thermostatic control including a member operatively connected to the indicator mechanism and to the load so as to move the former in accordance with the effect of the latter, a track for said member to guide the latter in its movement, and thermally responsive means to move the track so as to vary the path of movement of the member as it rides upon the track, said thermally responsive means and said track being secured to the stationary frame of the scale.

4. For a scale having an indicator mechanism, a thremostatic control including a member operatively connected to the indicator mechanism and to the load so as to move the former in accordance with the effect of the latter, a track for said member to guide the latter in its movement, and thermally responsive means to move the track so as to vary the path of movement of the member as it rides upon the track, said indicator mechanism including a rack rod to which the member is operatively connected.

5. For a scale having an indicator mechanism, a thermostatic control including a member operatively connected to the indicator mechanism and to the load so as to move the former in accordance with the effect of the latter, a track for said member to guide the latter in its movement, and thermally responsive means secured to the stationary frame of the scale to move the track so as to vary the path of movement of the member as it rides upon the track, said track being pivotally connected to the stationary frame, and there being a pivotal connection between the thermally responsive means and the track.

6. In a hanging scale, a stationary frame, a pointer shaft, a rack rod for said pointer shaft, a member operatively connected to the rack rod and having a load support depending therefrom, a track pivotally mounted on the frame and upon which one end of the member may ride as it moves in response to the load effect, and thermally responsive means mounted on the frame and pivotally connected to the track so as to move the latter in such a manner as to vary the path of movement of the member as it rides upon the track.

7. In a hanging scale, a stationary frame, a pointer shaft, a rack rod for said pointer shaft, a member operatively connected to the rack rod and having a load support depending therefrom, load springs depending from said frame, an equalizer connecting the lowermost ends of the springs and means pivotally connecting the member with the equalizer, a track pivotally mounted on the frame and upon which one end of the member may ride as it moves in response to the load effect, and thermally responsive means mounted on the frame and pivotally connected to the track so as to move the latter in such a manner as to vary the path of movement of the member as it rides upon the track.

8. A stem and runner unit for hanging scales including a U shaped runner to the bottom end of which a load support is secured, a bearing in said runner adapted to receive a pivot bar, stem plates disposed within the U of said runner, a connector, one of whose ends is pivotally connected to the sides of the runner and the other of whose ends is pivotally connected to the sides of the stem plates, a stem fork secured to ends of the stem plates, certain of the ends of the fork bearing guide wheels and one of the ends pivotally bearing a bell crank, one of whose ends is provided with a guide wheel, and the other of whose ends is pivotally connected to a scale rack rod, the stem plates supporting between them a grooved track-forming piece.

9. Means for connecting the upper end of a scale spring to a frame part including a spring holder bar, one of whose ends is pivotally connected to the frame part, and the other of whose ends is adjustably connected to the frame part, a bolt passing thru said holder bar, a rocker between the bolt head and the upper surface of the bar, a spring hanger threaded onto the lower end of the bolt, and disposed within end coils of the spring, the rocker comprising a hollow cylinder thru which the bolt passes, and having a wedge shaped lower end.

10. Means for connecting the upper end of a scale spring to a frame part including a spring holder bar, one of whose ends is pivotally connected to the frame part, and the other of whose ends is adjustably connected to the frame part, a bolt passing thru said holder bar, a rocker between the bolt head and the upper surface of the bar, a spring hanger threaded onto the lower end of the bolt, and disposed within end coils of the spring, the rocker comprising a hollow cylinder thru which the bolt passes, and having a wedge shaped lower end, the adjustable connection between the holder bar and the frame part including a bolt threaded thru an end of the bar and abutting a portion of the frame.

11. A thermostatic control for a scale including a track pivotally mounted on a stationary frame, a thermally responsive bar secured to said frame and having an end pivotally connected to said track, and a second bar, also secured to said frame and having slidably mounted thereon clamp means whereby said thermal bar may be clamped to the fixed bar, so that the free moving length of the thermal bar may be adjusted.

12. A stem and runner unit for hanging scales including a U shaped runner to the bottom end of which a load support is secured, a bearing in said runner adapted to receive a knife edged pivot bar, stem plates disposed within the U of said runner, a connector, one of whose ends is pivotally connected to the sides of the runner and the other of whose ends is pivotally connected to the sides of the stem plates, a stem fork secured to ends of the stem plates, certain of the ends of the fork bearing guide wheels and one of the ends pivotally bearing a bell crank, one of whose ends is provided with a guide wheel, and the other of whose ends is pivotally connected to a scale rack rod.

13. A stem and runner unit for hanging scales including a U shaped runner to the bottom end of which a load support is secured, a bearing in said runner adapted to receive a knife edged pivot bar, stem plates disposed within the U of said runner, a connector, one of whose ends is pivotally connected to the sides of the runner and the other of whose ends is pivotally connected to the sides of the stem plates, a stem fork secured to ends of the stem plates, certain of the ends of the fork bearing guide wheels and one of the ends pivotally bearing a bell crank, one of whose ends is provided with a guide wheel, and the other of whose ends is pivotally connected to a scale rack rod, and a spring connecting an end of the rack rod to a stem plate.

14. Means for connecting a scale part to a knife edged pivot bar passing transversely therethru, including a plate movably secured to the scale part and having an end disposed in a transverse slot in the pivot bar.

15. Means for connecting a scale part to a knife edged bar passing transversely therethru, including a bearing having a scarfed bottom surface in the scarf of which the upper knife edge of the pivot bar is disposed, and a plate secured to the part and having an end disposed in a transverse slot in the pivot bar.

16. Means for pivotally connecting scale parts to each other, including a knife edged pivot bar passing transversely thru both of said parts, the bar being fixed to one of the parts and having an edge disposed in a bearing in the other, and plates secured to said parts and having ends disposed in transverse slots in the pivot bar.

17. Means for connecting the upper end of a scale spring to a frame part including a spring holder bar, one of whose ends is pivotally connected to the frame part, and the other of whose ends is adjustably connected to the frame part, a bolt passing thru said holder bar, a rocker between the bolt head and the upper surface of the bar, a spring hanger threaded onto the lower end of the bolt, and connected to the end of the spring.

18. Means for connecting the upper end of a scale spring to a frame part including a spring holder bar, one of whose ends is pivotally connected to the frame part, and the other of whose ends is adjustably connected to the frame part, a bolt passing thru said holder bar, a spring hanger threaded onto the lower end of the bolt, and connected to the end of the spring, the adjustable connection between the holder bar and the frame part including a bolt threaded thru an end of the bar and abutting a portion of the frame.

19. For a scale having an indicator mechanism, a thermostatic control including a member operatively connected to the indicator mechanism and to the load so as to move the former in accordance with the effect of the latter, a track for said member to guide the latter in its movement and thermally responsive means secured to the stationary frame of the scale, to move the track so as to vary the path of movement of the member as it rides upon the track, said track being pivotally connected to the stationary frame.

20. In a hanging scale, a stationary frame, a pointer shaft, a rack rod for said pointer shaft, a member operatively connected to the rack rod and having a load support depending therefrom, load springs depending from said frame, an equalizer connecting the lower-most ends of the spring and means pivotally connecting the member with the equalizer, the means including a stem and runner unit mounted so as to be vertically movable in the frame, there being friction reducing means between the frame and the stem and runner unit for guiding the latter in its movement in the frame, the lower end of the unit being provided with a load support, a track pivotally mounted on the frame and upon which one end of the member may ride as it moves in response to the load effect, and thermally responsive means mounted on the frame and pivotally connected to the track so as to move the latter in such a manner as to vary the path of movement of the member as it rides upon the track.

21. In a hanging scale, a stationary frame, a pointer shaft, a rack rod for said pointer shaft, a member operatively connected to the rack rod and having a load support depending therefrom, a track pivotally mounted on the frame and upon which one end of the member may ride as it moves in response to the load effect, thermally responsive means mounted on the frame and pivotally connected to the track so as to move the latter in such a manner as to vary the path of movement of the member as it rides upon the track, load springs depending from said frame, an equalizer connecting the lower-most ends of the springs and means pivotally connecting the member with the equalizer, the means including a stem and runner unit mounted so as to be vertically movable in the frame, there being friction reducing means between the frame and the stem and runner unit for guiding the latter in its movement in the frame, the lower end of the unit being provided with a load support, the unit having a knife edged, pivotal, connection to the equalizer.

22. In a hanging scale, a stationary frame, a pointer shaft, a rack rod for said pointer shaft, a member operatively connected to the rack rod and having a load support depending therefrom, a track pivotally mounted on the frame and upon which one end of the member may ride as it moves in response to the load effect, thermally responsive means mounted on the frame and pivotally connected to the track so as to move the latter in such a manner as to vary the path of movement of the member as it rides upon the track, load springs depending from said frame, an equalizer connecting the lower-most ends of the springs and means pivotally connecting the member with the equalizer, the means including a stem and runner unit mounted so as to be vertically movable in the frame, there being friction reducing means between the frame and the stem and runner unit for guiding the latter in its movement in the frame, the lower end of the unit being provided with a load support, there being a dashpot piston operatively connected to the stem and runner unit by means of dash pot plates whose ends are secured to the unit and to the piston, substantially as described.

23. Means for adjusting and holding a dash pot to a frame part adapted therefor of a scale including a bolt at one end of the pot holding same endwise to the frame and radial adjusting screws near the other end of the pot fixing and holding the dash pot in alignment with the frame.

In testimony whereof, I, JOHN C. MATHEWS, sign this specification.

JOHN C. MATHEWS.